United States Patent
Nielsen et al.

(10) Patent No.: US 11,909,161 B2
(45) Date of Patent: Feb. 20, 2024

(54) POWER CABLE END TREATMENT DEVICE

(71) Applicant: ReliBond ApS, Roskilde (DK)

(72) Inventors: Martin Sander Nielsen, Frederiksberg (DK); Christian Michelsen, Valby (DK); Søren Isaksen, Lejre (DK)

(73) Assignee: RELIBOND APS, Roskilde (DK)

( * ) Notice: Subject to any disclaimer, the term of this patent is extended or adjusted under 35 U.S.C. 154(b) by 512 days.

(21) Appl. No.: 16/977,553

(22) PCT Filed: Mar. 6, 2019

(86) PCT No.: PCT/DK2019/050081
§ 371 (c)(1),
(2) Date: Sep. 2, 2020

(87) PCT Pub. No.: WO2019/170205
PCT Pub. Date: Sep. 12, 2019

(65) Prior Publication Data
US 2021/0006027 A1  Jan. 7, 2021

(30) Foreign Application Priority Data

Mar. 7, 2018  (DK) .......................... PA 2018 00104

(51) Int. Cl.
*B23P 19/00* (2006.01)
*H05K 13/04* (2006.01)
(Continued)

(52) U.S. Cl.
CPC ......... *H01R 43/22* (2013.01); *H01R 43/0263* (2013.01); *H02G 1/14* (2013.01)

(58) Field of Classification Search
CPC ...... H02G 1/14; H01R 43/0263; H01R 43/22; H01R 43/28; B25H 3/006; B23K 26/354; B23K 2101/32
See application file for complete search history.

(56) References Cited

U.S. PATENT DOCUMENTS

| 1,904,162 A | 4/1933 | Milliken |
| 3,114,292 A | 12/1963 | Harris et al. |
| (Continued) | | |

FOREIGN PATENT DOCUMENTS

| CN | 102859799 A | 1/2013 |
| CN | 103433568 A | 12/2013 |
| (Continued) | | |

OTHER PUBLICATIONS

Office Action (Notification of the Third Office Action) issued on Aug. 3, 2021 by the National Intellectual Property Administration, PRC in corresponding Chinese Patent Application No. 201780068498. 7, and an English Translation of the Office Action. (12 pages).

(Continued)

*Primary Examiner* — Paul D Kim
(74) *Attorney, Agent, or Firm* — Boone IP Law

(57) ABSTRACT

A cable treatment device including: an affixing device for reversibly securing to a circumference of a power cable a kinematic device having attachment structure for attaching to the affixing member, the kinematic device adapted to provide kinematic motion relative to the attachment structure, the kinematic motion being fully controllable through a plurality of force input connections, and a tooling device attached to the kinematic device, the tooling device adapted to receive said kinematic motion, wherein the kinematic device allows the tooling to move cross-sectionally relative to the extension of a power cable secured by the affixing device. Thereby, a well-controlled and reproducible process is achieved, employing a portable device being user friendly, while simultaneously reducing technician exposure to toxic particulates.

19 Claims, 7 Drawing Sheets

Figure 1:
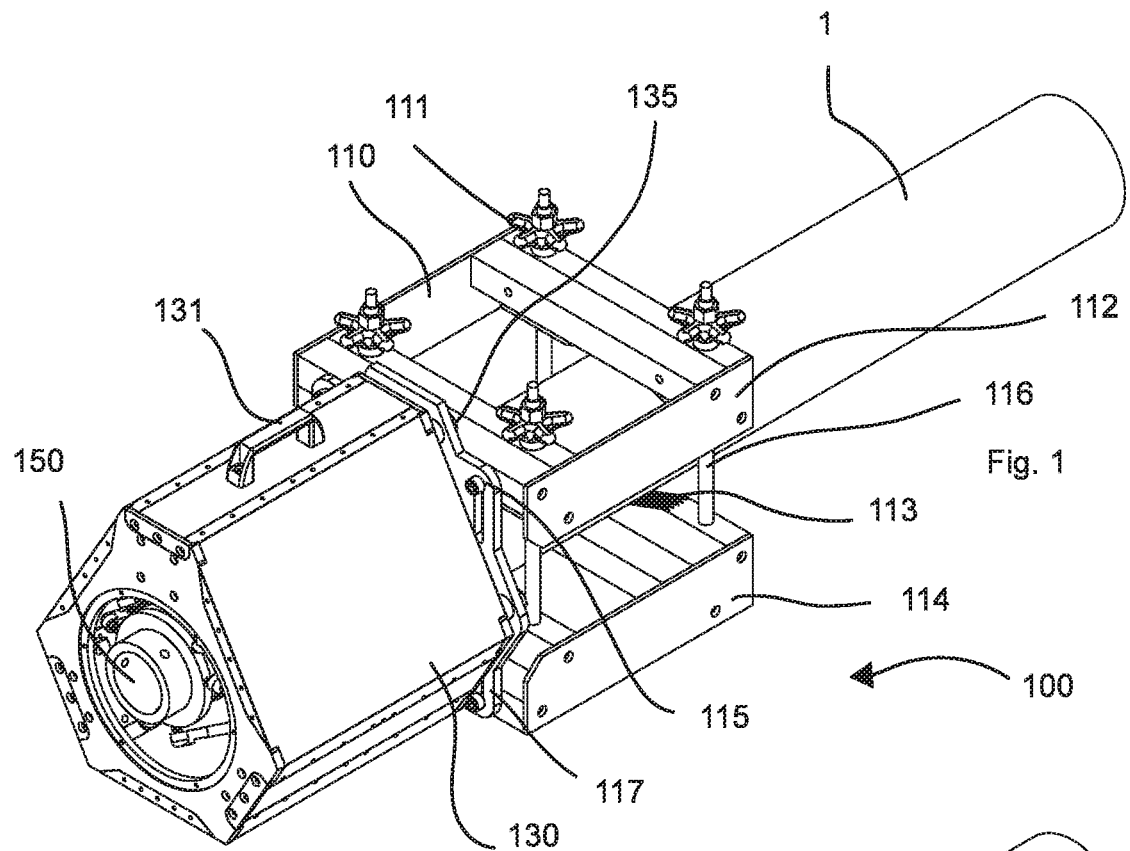

(51) Int. Cl.
H01R 43/22 (2006.01)
H01R 43/02 (2006.01)
H02G 1/14 (2006.01)

(56) References Cited

U.S. PATENT DOCUMENTS

| | | | |
|---|---|---|---|
| 3,402,758 | A | 9/1968 | Cushman |
| 4,512,828 | A | 4/1985 | Helm |
| 5,606,149 | A | 2/1997 | Yaworski et al. |
| 10,513,785 | B2 * | 12/2019 | Glasscock ............. E21B 43/128 |
| 2009/0252986 | A1 | 10/2009 | Owen et al. |
| 2010/0051718 | A1 | 3/2010 | Vanderzwet et al. |
| 2010/0326512 | A1 | 12/2010 | Berek et al. |
| 2011/0177358 | A1 | 7/2011 | Horton et al. |
| 2011/0289765 | A1 | 12/2011 | Bohn et al. |
| 2013/0072075 | A1 | 3/2013 | Kayamoto |
| 2013/0244471 | A1 | 9/2013 | Andrew et al. |
| 2014/0000110 | A1 | 1/2014 | Stauch et al. |
| 2014/0007421 | A1 | 1/2014 | Portas et al. |
| 2014/0134456 | A1 | 5/2014 | Horton et al. |
| 2014/0166474 | A1 | 6/2014 | Horton et al. |
| 2014/0260478 | A1 | 9/2014 | Forbes et al. |
| 2015/0005939 | A1 | 1/2015 | Di Stefano et al. |
| 2015/0075864 | A1 | 3/2015 | Boedec et al. |
| 2015/0137398 | A1 | 5/2015 | Perez |
| 2016/0164238 | A1 | 6/2016 | Hobson |
| 2016/0247599 | A1 | 8/2016 | Schmidt et al. |
| 2018/0042119 | A1 | 2/2018 | Dantin et al. |
| 2018/0109015 | A1 | 4/2018 | Gregor |
| 2018/0267498 | A1 | 9/2018 | Helmick et al. |
| 2018/0337430 | A1 | 11/2018 | Suzuki et al. |

FOREIGN PATENT DOCUMENTS

| | | | |
|---|---|---|---|
| CN | 104439383 | A | 3/2015 |
| CN | 105008063 | A | 10/2015 |
| DE | 10223397 | A | 12/2003 |
| DE | 102010039594 | A1 | 2/2012 |
| DE | 10 2015 210458 | A1 | 12/2016 |
| EP | 2209161 | A1 | 7/2010 |
| EP | 2821159 | A1 | 1/2015 |
| JP | 58009775 | A | 1/1983 |
| JP | S58138574 | A | 8/1983 |
| JP | H 3-77291 | A | 4/1991 |
| JP | 06165330 | A * | 6/1994 |
| JP | 2007012999 | A | 1/2007 |
| JP | 2013030338 | A | 2/2013 |
| JP | 2015-042045 | A | 3/2015 |
| JP | 2016517472 | A | 6/2016 |
| JP | 2018-196901 | A | 12/2018 |
| JP | 2018-200866 | A | 12/2018 |
| WO | 2014/149996 | A2 | 9/2014 |
| WO | 2014206474 | A1 | 12/2014 |
| WO | 2015188923 | A1 | 12/2015 |

OTHER PUBLICATIONS

Office action for related Patent Application in Japan No. 2019-533277, dated Jun. 29, 2021.
Office Action (Communication under Rule 71(3) EPC) dated Apr. 29, 2022, by the European Patent Office in corresponding European Application No. 19 718 241.3-1201. (40 pages).
Written Opinion of the International Searching Authority; International application No. PCT/DK2017/050281; International filing date May 9, 2017; International Searching Authority; pp. 1-5.
International Search Report for International application No. PCT/DK2019/050081 dated Jul. 12, 2019.
Search Report for application No. PA 2018 00104 dated Jun. 13, 2018.
Written Opinion of the International Searching Authority; International application No. PCT/DK2019/050081; International filing date Mar. 6, 2019; International Searching Authority; pp. 1-8.
Office action for U.S. Appl. No. 16/330,467 dated Nov. 13, 2020.
Examination report for EP 17 787 104.3 dated Nov. 6, 2020.
Search Report for Danish application No. PA 2017 00180 dated Jun. 12, 2017.
Office Action (Notice of Reasons for Refusal) dated Jan. 24, 2023, by the Japanese Patent Office in corresponding Japanese Patent Application No. 2020-544808, and an English Translation of the Office Action. (9 pages).

* cited by examiner

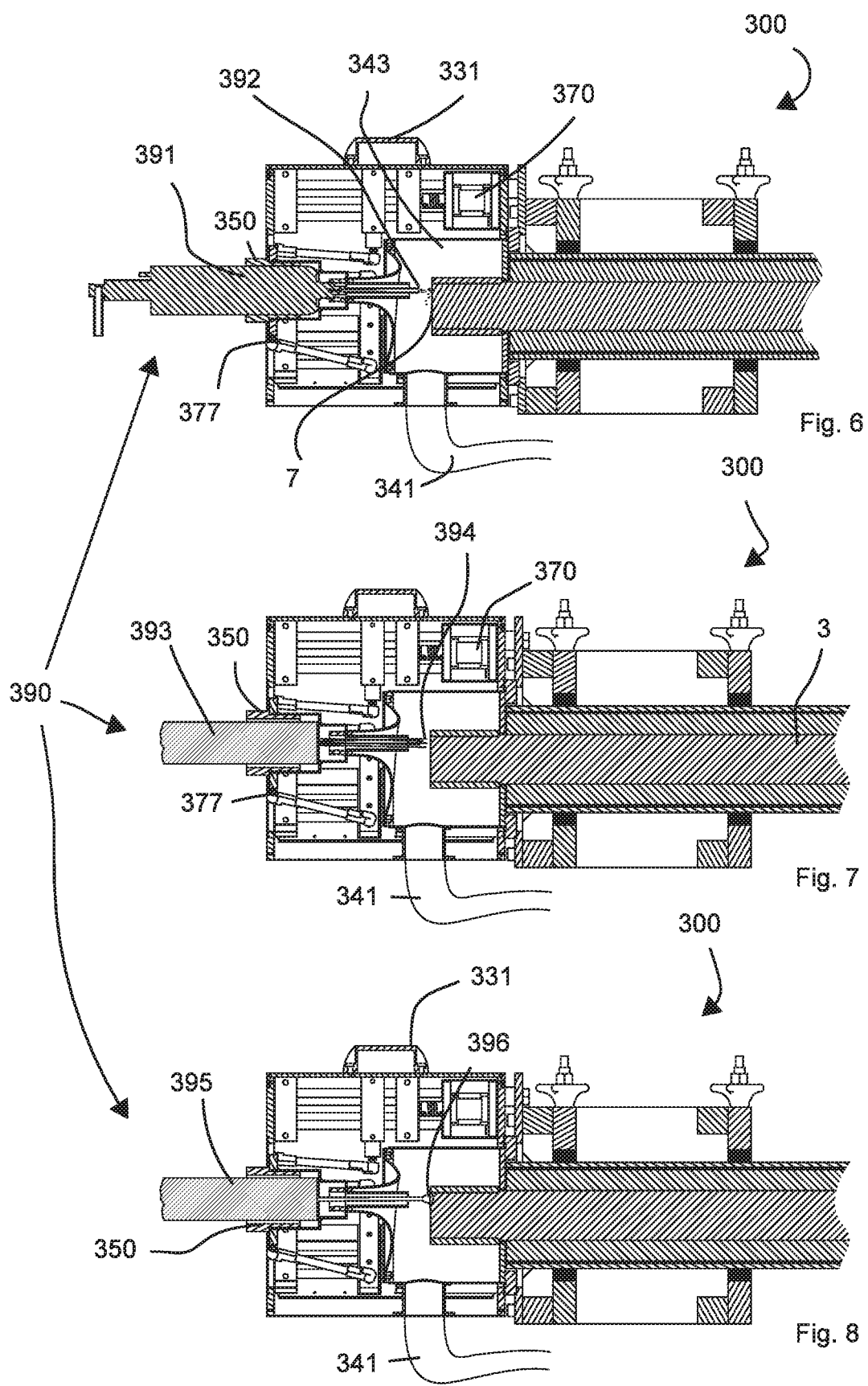

POWER CABLE END TREATMENT DEVICE

CROSS-REFERENCE TO RELATED APPLICATIONS

This is a National Stage application of PCT international application PCT/DK2019/050081 filed on Mar. 6, 2019, which claims the priority of Denmark Application No. PA 2018 00104, filed Mar. 7, 2018, which are incorporated herein by reference in their entireties.

FIELD OF THE INVENTION

The current invention relates to a device and method for treatment of power cable ends, especially termination and joining of multi-stranded cables.

BACKGROUND OF THE INVENTION

Cables of various sizes and material compositions are used for transportation of electrical current and power. Where the demand for electrical power transmission is high, such as in the power transmission and power distribution systems between a power source and densely populated or industrial areas the required cable dimensions likewise increase. Installation is performed by unrolling cables, followed by burying them underground or pulling them in conduits or ducts. The larger the cables, the shorter the cable length that can be transported on a single cable reel from cable factory to the installation site, necessitating more cable joints. With the recent increase in use of aluminium cables, this is exacerbated, as a given cable power transmission requirement necessitates a larger diameter cable if made from aluminium as compared to a cable made from copper. Thus, more cable joining is needed on site, and each cable joints represents a potential point of failure. Larger cables have very complex cross-sections, including strands and/or sectors to have sufficient bending flexibility to be able to be transported on reels, and even non-conductive materials such as wire varnishes and swelling material. It is then difficult and extremely time consuming to weld a large diameter cable.

The welding process poses a number of risks for reducing the quality of joints or terminations. The high temperature at the welding point can negatively influence the quality of the cable insulation material close to the welding point. As the thermal mass increases with cable size, issue becomes bigger the larger the cable size is. To reduce this risk active cooling of the cable conductor close to the welding is used, which on has the risk of reducing the quality of the welding process. All these factors mean that it requires extremely qualified and well-trained labour to make reliable joints for large size cables and quite often the joints fail at testing and needs to be redone.

Efforts to increase quality of joints and joining speed have been proposed. For example, methods have been proposed to electrically connect the wires in different ways. In US 2014/000110, cables are terminated with a sleeve having many through-going screws digging into the cable conductor core in an effort to build an improved electrical connection between the individual wires or sectors of the cable and the cable joint or termination.

However, these terminations are cumbersome and not quite up to par, such as because cable expansion and contraction throughout its life in response to changes in temperature may reduce surface contact and surfaces may oxidize, especially if the cables are of aluminium. Therefore, an improved approach is needed for attaining quality cable joints and terminations.

SUMMARY OF THE INVENTION

It is the aim of the current invention to alleviate at least some of the above-mentioned problems. This is achieved by a cable treatment device for treatment of the end section of a power cable. The cable treatment device comprises an affixing means for reversibly securing to a circumference of a power cable, a kinematic means having attachment means for attaching to the affixing member, said kinematic means adapted to provide kinematic motion relative to said attachment means, the kinematic motion being fully controllable through a plurality of force input connections, and a tooling means attached to said kinematic means, said tooling means adapted to receive said kinematic motion, wherein the kinematic means allows the tooling means to move cross-sectionally relative to the extension of a power cable secured by the affixing means.

Thereby fully controllable motion is achieved for cable end treatments. This further allows repeatability between cable end treatments such as cable joints and terminations, where the quality is important, and where quality control is paramount so that faultily termination or joining of installed cables is avoided, which can otherwise lead to subsequent needs for repairs, which are expensive. Furthermore, by the device attaching directly to the power cable, alignment is ensured which makes the device user friendly and portable, and even further improves treatment quality. Even further, treatment of a cable end using the cable treatment device decreases the user exposure to heavy tools and toxic fumes, as they can leave while the device treats the cable end, and the process can take place in an enclosed and exhausted environment while the device treats the cable end.

The cable treatment device thus allows treatments of cable end sections to be performed automatedly and without technicians being exposed to treatment fumes. An important treatment that the cable treatment device can perform is joining the wires/strands and/or sections of an end section of a power cable, either by melting the existing cable end material, or by additionally adding material at the cable end to electrically connect them all. Often, a mix of the two processes take place during welding. When the wires and sectors of the cable conductor are all electrically joined, a crimp on the outside periphery may be connected to all of the wires and may carry the electrical transmission on to the next cable segment.

Thereby is achieved also a device that is adapted to work effectively on a variety of different cable ends and may even work in ways that is not possible to do manually. For example, when welding, it is possible to move from one part of the conductor to an opposite or different part in response to a shift in temperature, thereby preventing damaging the cable while maintaining the treatment pace. This may for example be performed in response to a temperature measurement of the cable or a calculation based on at least the tool, the process and the thermal mass of the cable.

By cable treatment device is meant a device for treating a power cable end section and/or a power cable end surface. In an embodiment, the cable treatment device is specifically a power cable end treatment device.

By the kinematic means allowing the tooling means to move cross-sectionally relative to the extension of a power cable secured by the affixing means is meant that the cross-section is at distance in front of the cable end. This cross-section may then be accessed from the front or the side. In an embodiment, the kinematic means allows the tooling means to move cross-sectionally relative to the extension of a power cable along a plane in front of a power cable secured by the affixing means.

In an embodiment the affixing is reversibly secured, meaning that that the affixing can be mounted and dismounted on the power cable without substantially damaging the power cable.

In a preferable embodiment, the affixing means is adapted to secure cables of various diameters, preferably adapted to secure to cables that are between a given lower diameter D and at least another diameter 1,1·D. This includes affixing to the conductor circumference alone, as well as to the circumference of the cable including isolation, and including isolation and sheathing. An upper and a lower part, for example, may be pressure fit with connecting rods and secured with fastening bolts. The attachment interface is then adapted to accommodate this variable distance diameter, such as by using guide slits. Any other conventional adaptable connections may be used instead, such as mutual lines of bolt holes, a clamp-like mechanism, attaching to the upper part securely such as through screwing, then clamping to the opposite part. This ensures that a single device is needed for cable end treatments and is thus makes the device more user friendly. An alternative to an adaptable affixing means is to have several different affixing means, one for each of various cable sizes. In an embodiment, the affixing means is adapted to secure around the circumference of the power cable.

In an embodiment, the affixing means is adapted to fit to cables having a range of diameters, where the lowest diameter it is adapted to secure to have a diameter D and where it is at least also able to attach to cables having a diameter of 1,1·D, a diameter of 1,2·D, a diameter of 1,3·D, a diameter of 1,4·D, a diameter of 1,5·D, a diameter of 1,6·D or a diameter of 1,7·D.

In an embodiment, the affixing means attaches along the axial direction of the power cable to support the weight of the cable treatment apparatus. Thereby, an even more self-sufficient and adaptable device is achieved. For example, the affixing means comprise two sets of grooves that better counteracts the momentum generated by the weight of the device as well as further stabilises it during treatment.

By the kinematic means being attachable to the affixing means, the two parts are either supplied fixed together or with a mutual interfacing that allows them to be disassembled and assembled. In an embodiment, the kinematic means is fixedly attached to the affixing means. Thereby, a larger, simpler device is supplied. In a preferable embodiment, the kinematic means is detachable relative to the affixing means. Thereby, two more portable parts are supplied, where the affixing means can be attached to the cable end first. This allows the device to be more adaptably attached to cables of various diameters, to be more user friendly and allows more controlled alignment of the cable end in the cable treatment device.

By cable end is meant the whole end of the cable, including the conductor including conductive wire strands and possibly a core, as well as insulation layers and the mechanically and electrically protective outer layers. Tool heads may be envisioned that can work with the outer layers of the cable to remove an end portion of it, for example. By end surface of the conductor is meant the end surface of the electrically conductive part of the cable.

The kinematic means facilitates controlled motion of the tooling means relative to the attachment means. When a power cable is attached to the affixing means, this effectively controls the kinematic means relative to the cable as well. The kinematic means is not self-driven, but instead is fully controllable through outside forces connected to it through the force input connections. By inputting force to these force input connections, the kinematic means translates this predictably into displacement of the kinematic means, and hence, the tooling means. The kinematic means thus comprises a manipulator to produce predictable motion, such as through a plurality of successively constrained kinematic chains.

By inputting force into a set of the force input connections, parts of the kinematic means controllably move to change the position of the tooling means. For example, the force input connections may be forced in a manner that translates the tooling means from being centred against the cable end, to a position at the periphery of the cable end, such as in preparation for a treatment sequence/step.

In an embodiment, an affixing axis is colinear with the central axis of a power cable secured by the affixing means, where the kinematic means is adapted to attach to the affixing means in a manner whereby it is oriented and located angularly to the affixing axis relative to the affixing means, preferably perpendicularly to the affixing axis, whereby the cable treatment device is adapted to treat a combined V-shape of the end surfaces of two power cables arranged for joining. In other words, the kinematic means is placed on the side of the cable, and moves the tooling means to act on the cable end from the side instead of from the front. This then allows the cable treatment device to act on two cable ends that are arranged close and opposed to each other, such as cables to be joined.

Besides working on cables whose ends are cut perpendicular to the axial direction of the cable, the device is also adapted to work on cables that are cut at another cross-sectional angle relative to their axial direction, such as a 45-degree angle. Treating angled cable ends is especially interesting where two cables are to be joined. For such situations, the two cut cables may be brought to alignment, facing each other so that a V-shaped cut is achieved between them. This cut may extend all the way through or half-way through the cables, in which latter case another treatment is preferably performed on the opposite half of the cables subsequently. The two cables can be kept in alignment for example using a ferrule applied to both cable ends, and the cable treatment device may then be secured to one of them and still be fixed relative to both. In an embodiment, the cable treatment device comprises a second affixing means. Further, the kinematic means has a second attachment means to attach to this second affixing means, allowing the kinematic means to attach to two adjacent affixing means secured to two adjacent power cables (100) whose central axes are colinear. Thereby, an even better affixing is achieved when using the cable treatment device for joining two cables. After bringing the cables to alignment, the device is attached to either cable or preferably both of the cables. Then the end sections of the cables are treated, and they may for example be joined together, if a proper tool is used such as a welding tool.

The cable treatment device is, when used, preferably connected to a forcing means such as a motor at each force input connection to drive the motion of the kinematic means. The motor may be any conventional type, such as a stepper motor, a servo motor, an actuator, a hydraulic or pneumatic type, and so on.

In an embodiment, the tooling means is afforded at least two degrees of freedom by the kinematic means. In an embodiment, the tooling means is afforded at least three degrees of freedom by the kinematic means. In an embodiment, the tooling means is afforded at least four degrees of freedom by the kinematic means. In an embodiment, the tooling means is afforded at least five degrees of freedom by the kinematic means. In an embodiment, the tooling means is afforded six degrees of freedom by the kinematic means. In an embodiment, the tooling means is afforded at least three axial degrees of freedom by the kinematic means. In an embodiment, the tooling means is afforded at least two axial degrees of freedom and one rotational degree of freedom by the kinematic means. In an embodiment, the kinematic motion provided by the kinematic means and controllable through a plurality of force input connections has at least three spatial degrees of freedom and one rotational degree of freedom. In an embodiment, the tooling means is afforded at least three axial degrees of freedom and two rotational degree of freedom by the kinematic means. In an embodiment, the tooling means is afforded at least three axial degrees of freedom and three rotational degree of freedom by the kinematic means. Conveniently, the cable treatment apparatus has a motor or other forcing means connected to the kinematic means for each degree of freedom. Other words for the axial degrees of freedom are translational/linear degrees of freedom.

Thereby, an improved treatment is achieved. For example, when building a layer of conductive material on the end of the cable conductor, it may be preferable to build at an angle to at least partially build onto previously applied material if a hole between strands is encountered in the cable end. Furthermore, by having three axial degrees of freedom, distance between the cable end and the tool can be changed for more local or spread out treatments.

In an embodiment, the kinematic means comprises a serial manipulator such as a robot arm or a cartesian printer-style kinematic manipulator. Thereby, the coordinates are predicable to reach and coding the necessary software is easy.

In a preferable embodiment, the kinematic means comprises a parallel manipulator such as the kinematic part of a delta-type robot or Stewart platform. Thereby, stiffness and operation precision, is improved and because there is less mass transport of the manipulator itself during operation, faster movement is allowed while retaining control. Further, the device may then be compact.

In an embodiment, the kinematic means has a plurality of kinematic chains being successfully constrained and arranged to form the parallel manipulator, where the tooling means forms an end effector to the parallel manipulator. In other words, the kinematic means comprise a plurality of chains made up of linkages and joints, each of which moves predictably (being kinematic chains), and each of which is externally driven by an outside force (being successfully constrained), such as a motor. These are then joined to a single, common link, the end effector (the tooling means), farthest from their respective drivers, to collectively move the end effector with more degrees of freedom than the kinematic chains have individually. All the degrees of freedom that are supplied to the end effector are controlled by the kinematic chains, whereby the movement of the end effector becomes predicable and fully controllable through the kinematic means.

In a preferable embodiment where the kinematic means comprise a parallel manipulator, the parallel manipulator is constructed so the force input connections are located around where the cable end is located during treatment. In other words, it is located close to the attachment means, or in yet other words, next to the work area of the cable treatment device. When installed on a cable, the force input connectors are then located close to the cable end. Thereby, an especially stiff and vibration-resistant device is achieved. Since the weight of the device is thus placed close to the point of attachment to the cable, vibrations are absorbed hereto. This further allows the device to work faster. Further, the device is then quite compact and easy to transport.

In an embodiment, the cable treatment device comprises a plurality of motors connected to the kinematic means through the plurality of force input connections. Thereby the cable treatment device allows an electrical input to control and power the movement of the kinematic means, thereby moving the tooling means predictably to treat the end section of a power cable. The plurality may be any type of motor that is adapted to convert electrical energy or chemical energy to kinetic energy, such as servo-motors, stepper motors, DC motors, actuators, hydraulic motors and so on. Servo-motors and stepper motors are convenient for their potential small sizes as well as the low wear they experience. By the motion being predictable is not meant that singularities within a motion space are necessarily weeded out.

In an embodiment, the cable treatment device further comprises controller means. The controller means has: storage means for storing cable end treatment data translatable to operation of a plurality of motors, signalling means for signalling cable end treatment instructions from the storage means, processing means for receiving and processing the cable end treatment instructions to produce operation instructions for the plurality of motors, and transmission means for transmitting the operation instructions, such as transmitting to the plurality of motors. In an embodiment comprising a plurality of motors and a processing unit, the transmission means transmits the operation instructions to the plurality of motors. Thereby, a device adapted to perform automated treatment of a cable end is achieved. This allows more precise treatment as well as repeatable and controllable treatment.

The storage means may be located any convenient place, and may be accessed over a network from afar, such as having a cloud-based storage means connected to the device. The processor may also be accessed over a network from afar, such as having a cloud-based computational unit connected to the device. The transmissions means and the signalling means may naturally be any type of transmission means or signalling means, such as conventional wired and wireless means.

In an embodiment, the controller means further has profile storage means for storing profiles having profile parameters relating to at least one of cable type, tool type or treatment type, user input means for selecting a profile from among profiles for a given cable end treatment, profile signalling means for signalling profile data according to the selected profile, wherein the processing means is adapted to receive the profile parameters, and wherein the processing takes the profile parameters into account to produce profile specific operation instructions.

In an embodiment, the profile storage means comprises cable profiles. These cable profiles have parameters comprising at least one of: diameter of the conductor; number of strands; cable type, including the cable cross-sectional layout; conductor material; threshold temperature; surface topology of the specific cable end which may have been mapped with sensors affording a 2d or 3d image, and may be mapped prior to a treatment and/or simultaneously with the treatment; and cable length. Cable length affects at least the heat absorption of the cable. Cables of certain materials may benefit from different treatments, such as longer/shorter initial flame treatments, different welding processes, different forces for needle hammering, etc. Thereby improved cable end treatment is achieved being better suited to each individual treatment type.

In an embodiment, the profile storage means comprises treatment profiles. Parameters relating to a treatment profiles comprise at least one of the following: size of treatment area; shape of treatment area; treatment intensity; treatment fidelity being a choice between many passes with low effect or fewer passes with higher effect; treatment speed; treatment pathing, including any conversion algorithm between a volume to be filled or an area to be treated to a motion to be taken by a tool head over the surface, optionally informed by the specific tool to be used; and information relating to subsequent and previous treatments.

In an embodiment, the profile storage means comprises tooling profiles being specific to various different tools. This may be especially advantageous where at least two different tools may adequately perform the same treatment, and then allows pre-programming the device to allow improved treatment with all associated, substitutable tools. Parameters relating to the tooling profiles comprise at least one of: motion modifier; pathing modifier; treatment options/variations available to a given tool; and how and for what the tool may potentially self-correct during treatment. Thereby improved cable end treatment is achieved being better suited to each individual situation. For example, the database may store a tooling profile instruction specific to needle hammering and one specific to welding, where the needle hammering tooling instruction may comprise a faster movement over the cable end surface or a different movement, such as having a larger distance between consecutive paths along the end surface. Furthermore, a specific tool may have more than one tooling profile, to achieve different treatments using the tool. For example, a flame or arc treatment may be used initially to remove impurities of the bare cable end; and may also be used after a cold-spraying process to heat treat the added material, and these treatments may naturally differ markedly. Thereby improved cable end treatment is achieved being better suited to each individual cable type.

In an embodiment, the device further comprise sensing means arranged to sense parameters of the treatment and/or a power cable secured by the affixing means. Thereby, the progress of a treatment can be monitored and even documented for compliance purposes. If gasses are produced for example, this can be identified early and any changes in treatment can be undertaken. If a certain treatment step has not achieved the desired result, it can be repeated without having to remove the device first.

In an embodiment, the cable treatment device comprises a camera, a laser scanning sensor or other sensor type to evaluate the cable end surface and/or treatment parameters before, during and/or after a given treatment step. The sensor means may comprise any sensor types that can usefully inform on the cable end or treatment. Preferably, the sensing means comprise visual sensors, such as an infrared sensor and/or a camera. Preferably, the sensor means allows sensing the cable end surface irrespective of orientation and position of the tool head, such as by having a plurality of sensors. Other useful sensor types include point/surface temperature sensors; gas temperature sensors; and chamber pressure sensors to check if the pressure in the chamber is kept within an acceptable range.

In an embodiment, initial cable end parameter sensory data is used to determine the specific treatment to be undertaken. In other words, sensor data is gathered before a specific treatment step. Different methods may be used to alleviate this. Problematic areas may be identified prior to treatment, and preferable angles of approach to best treat these areas may be chosen based on the sensor data, or the area may be treated more intensely or for a longer time, for example.

In an embodiment, sensor data is collected during cable end treatment, informing on the progress of treatment in a real-time fashion. Thereby, the sensor data can be used to inform the treatment. For example, if a certain area is not welded satisfactorily, this may be identified at once and the treatment may be adjusted accordingly, such as by tilting the tooling means or approaching the problematic area from a different angle.

In an embodiment, after a treatment using a particular tool, post-treatment cable end parameter sensory data is used to determine if the treatment was adequately effective. The outcome can then be reported to a technician, prompt the device to repeat the treatment, where it can potentially be focused on specific issues and/or specific areas, or advice the technician to change to a specific other tool, such as a sander to remove faultily applied material or proceed to the next step in cable preparatory work, when joining such power cables.

In an embodiment, the device comprises a cable end temperature sensor, adapted to measure the cable temperature. This is useful for example for welding treatments where heat is produced and transmitted to the cable, but where parts of the cable, such as parts of the isolation and sheathing that must not exceed a threshold temperature, like 90 degrees Celsius. When a threshold temperature is approached or transgressed, the treatment can be paused to allow the temperature to fall to more acceptable levels.

In an embodiment, the device comprises a cable cooling means. In an embodiment, the device comprises cooling means adapted to be secured around the cable end section to cool it during treatment, preferably a liquid cooling means. In an embodiment, the device comprises liquid cooling means adapted to be secured around the cable end section to cool it during treatment. In an embodiment, the device comprises liquid cooling means and a temperature sensing means, where the liquid cooling means is adapted to be secured around the cable end section to cool it during treatment, and where cooling is controlled according to temperature sensor data. Thereby, the cable end can be cooled while it is being treated. This is useful for example for welding treatments where heat is produced and transmitted to the cable, but where parts of the cable must not exceed a threshold temperature, like 90 degrees Celsius.

Where the cable cooling means and the cable end temperature sensor is combined, an even better thermal control is achieved.

Where all types of tools are referenced irrespective of how the tool is attached to the tooling means, the term tool head is used throughout the application. Where a tool being fixedly attached is referenced, this is termed an integrated tool head. Where a tool being inserted in the tool socket is referenced, this is termed a modular tool head.

In an embodiment, the cable treatment device further comprises a tool head connected to the tooling means, the tool head being a cable end treatment tool. Thereby, the device is ready to start treating the power cable end.

In an embodiment, the tool head is an additive manufacturing tool. By additive manufacturing tool is meant a tool for depositing a conductive material onto the end section of the power cable. Example additive manufacturing tools are welding tools, laser additive tools, like laser cladding and powder adding or spraying tools like cold spraying tools. Thereby, a simple structure is achieved, whose operation requires a minimum of sequence steps and is then user friendly.

In an embodiment, the tool head is a welding tool. Thereby, a simple structure is achieved, whose operation requires a minimum of sequence steps and is then user friendly. Welding may be any conventional welding type, including laser welding.

In an embodiment, where the tooling means is a welding tool, the power of the welding tool is controlled to maintain an effective welding process throughout the cable end treatment. Thereby, treatment control and quality are improved.

In an embodiment, wherein the tooling means is a tool socket for reversibly attaching to a plurality of different modular tool heads. Thereby, the total treatment procedure of a cable end is simplified and improved, while subsequent treatment steps can be coordinated, improving user friendliness and decreasing the need for technicians to use heavy tools.

In an embodiment, the tool head or modular tool head comprises two cable end treatment tools, where a first cable end treatment tool of the tool head is preferably a cold spraying tool, and where the second cable end treatment tool is preferably a peening tool or a heat treatment tool, preferably a welding tool. Thereby, a simpler operation and more isolated environment is achieved. In an embodiment, the tool head or modular tool head comprises three cable end treatment tools. In an embodiment, the tool head or modular tool head comprises four cable end treatment tools, Any relevant tool type can be connected to the tooling means. In an embodiment, one of a welding tool head, a hammering tool head, a cold spraying tool head, a blowtorch tool head, a laser tool head, a grinder tool head, a peeling tool head, a milling tool head, or an abrading tool is attached to the tooling means. In an embodiment, a tool head having at least two tools is attached to the tooling means. In an embodiment, a tool head having at least a cold spraying tool and one other tool is attached to the tooling means. In an embodiment, a tool head having at least a cold spraying tool and a welding tool is attached to the tooling means. In an embodiment, a tool head having at least a hammering tool such as a needle hammer tool and a cold spraying tool is attached to the tooling means. In an embodiment, a tool head having at least a welding tool and one other tool is attached to the tooling means.

In an embodiment, the cable treatment device further comprises a sealed work chamber. the sealed work chamber has an outer wall attached to a flexible membrane, the wall and membrane substantially sealing the work chamber from an outside environment, the sealed work chamber further having a workpiece opening for inserting a cable end in a first side of the sealed work chamber, the workpiece opening adapted to sealingly engage against the end section or circumference of the power cable, and a tool head opening connected to the tooling means in a second, opposite side of the sealed work chamber, allowing placing a tool head into the sealed work chamber, where the tool head opening or the tooling means is adapted to sealingly engage with an inserted tool.

Thereby, work environment is at least substantially isolated from an outside environment during treatment of a cable end. This improves isolation of toxic fumes and ash, dust and particles. Also, treatment quality is improved by ensuring fewer or no foreign particles interfere to contaminate the cable end treatment.

In an embodiment, the device comprise environment managing means for managing environment parameters of the sealed work chamber, the environment parameters relating at least to gas pressure, the managing means at least adapted to reduce the gas pressure in the sealed work chamber relative to the conditions outside the chamber. Thereby, even if the seal of the sealed work chamber is imperfect, no or few dangerous gasses, fumes or particles escape from the sealed work chamber during cable end treatment. This pressure reduction may be achieved by a suction channel connected to a filtered vacuum pump, for example.

In an embodiment, the sealed work chamber further comprises a gas inlet channel. This channel can at the far end be connected to a gas supply system preferably via a flow control mechanism to supply gas and ensure a controlled atmosphere in the work chamber, for instance an atmosphere primarily composed of inert gases. Such a gas supply channel can also be used keep a controlled flow of air nearby a vision camera, a sensor or a glass window to keep it clean and dust free by avoiding contaminants in settling on the camera, sensor or window surface. A window on the work chamber can be used for visual inspection, either by a person directly or via a camera or it can be used for having an intense laser beam scanning the cable end surface under treatment to locally heat treat the material at the cable end surface. In an embodiment, the gas inlet is part of the tool head used for treating the cable end.

In an embodiment, the force input connections are placed outside the sealed work chamber. Thereby, any motors attached to the cable treatment device is not in the sealed work chamber either. Thereby, durability of the motors is improved and the relative sizes of the work chamber and the motors does not directly affect one another.

In an embodiment, the kinematic means is placed outside work chamber. Thereby, durability of the kinematic means is improved and the relative sizes of the work chamber and the kinematic means does not directly affect one another.

In an embodiment, the cable treatment device is manually portable. Thereby, technicians can manually bring the cable treatment device to and from a work site, improving user friendliness. In an embodiment, they can manually lift the cable treatment device.

In an embodiment, the cable treatment device weighs less than 100 kg, less than 95 kg, less than 90 kg, less than 85 kg, less than 80 kg, less than 75 kg, less than 70 kg, less than 65 kg, less than 60 kg, less than 55 kg, less than 50 kg, less than 45 kg, less than 40 kg, less than 35 kg, less than 30 kg, less than 25 kg, less than 20 kg, less than 15 kg, or less than 10 kg.

In an embodiment, a cable treatment device comprises: a sealed work chamber, the sealed work chamber having an outer wall attached to a flexible membrane, said wall and membrane substantially sealing the work chamber from an outside environment, the sealed work chamber further having a workpiece opening for inserting a cable end in a first side of said sealed work chamber, said workpiece opening adapted to sealingly engage against the end section or circumference of said power cable, and a tool head opening connected to the tooling means in a second, opposite side of said sealed work chamber, allowing placing a tool head into the sealed work chamber, where the tool head opening or the tooling means is adapted to sealingly engage with an inserted tool, further having a kinematic means for attaching relative to the to the sealed work chamber, said kinematic means adapted to provide kinematic motion relative to said sealed work chamber, the kinematic motion being fully controllable through a plurality of force input connections, and a tooling means attached to said kinematic means, said tooling means adapted to receive said kinematic motion, wherein the kinematic means allows the tooling means to move cross-sectionally relative to the extension of a power cable and across its end section inserted in the sealed work chamber. Thereby, a cable end treatment device is supplied that allows fluid environment control and automation of cable end treatment processes.

In an aspect of the invention, it relates to a method of preparing for treating an end section of a power cable as described, comprising the steps of providing an affixing means for reversibly securing to a circumference of a power cable, then securing the affixing means to the power cable by securing it to its circumference, providing a kinematic means having attachment means for attaching to the affixing member, the kinematic means adapted to provide kinematic motion relative to the attachment means, the kinematic motion being fully controllable through a plurality of force input connections, and providing a tooling means attached to the kinematic means, the tooling means adapted to receive the kinematic motion, wherein the kinematic means allows the tooling means to move cross-sectionally relative to the extension of a power cable secured by the affixing means. The embodiments of the device are applicable for the method as well.

In an aspect, the invention relates to a method of using a cable treatment device as described for treating an end section of a power cable.

SHORT LIST OF THE DRAWINGS

Figure 2:
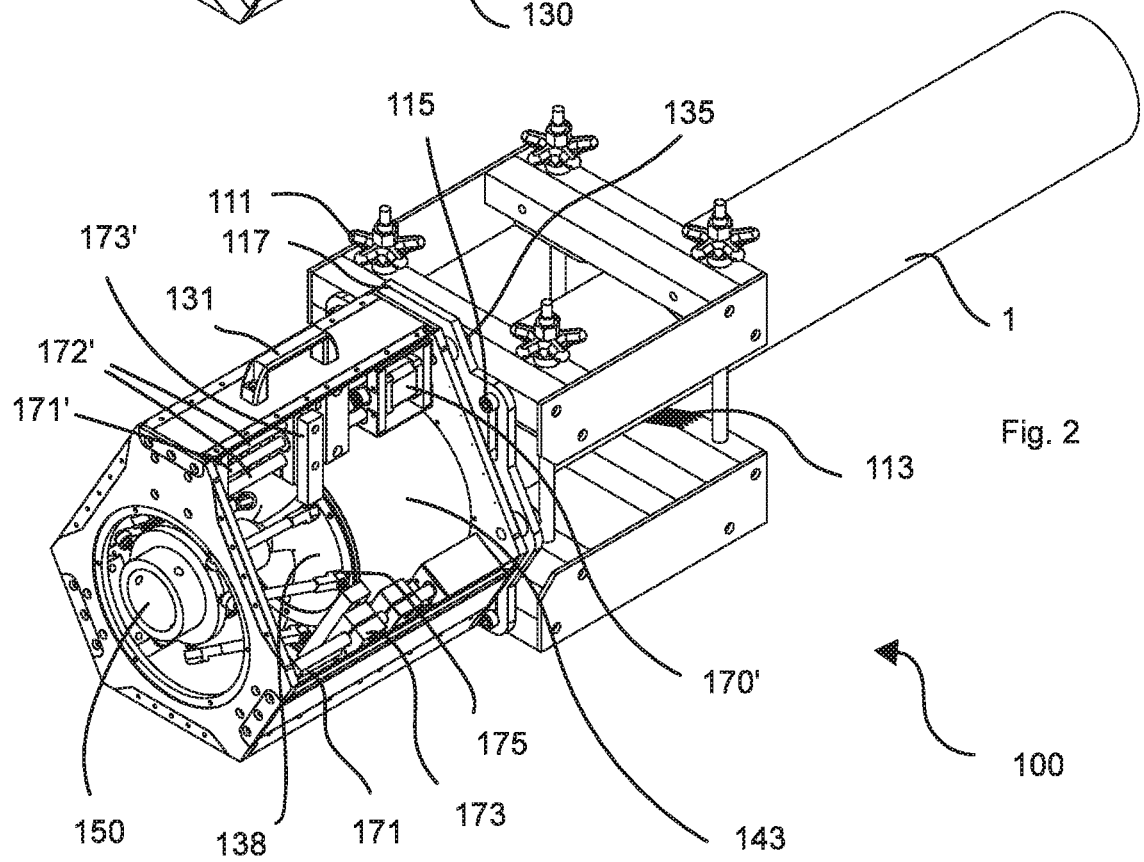
Figure 3:
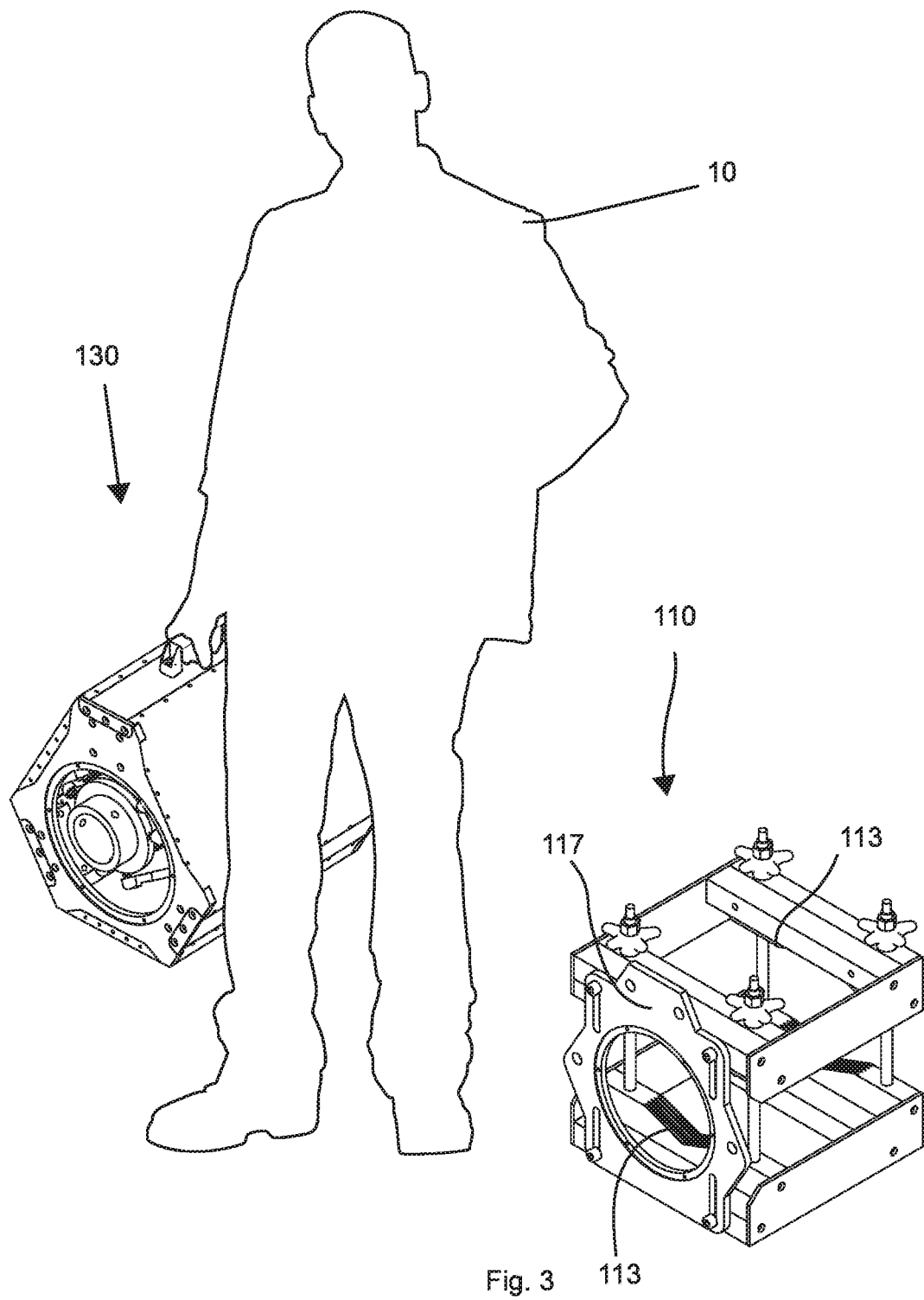
Figure 4:
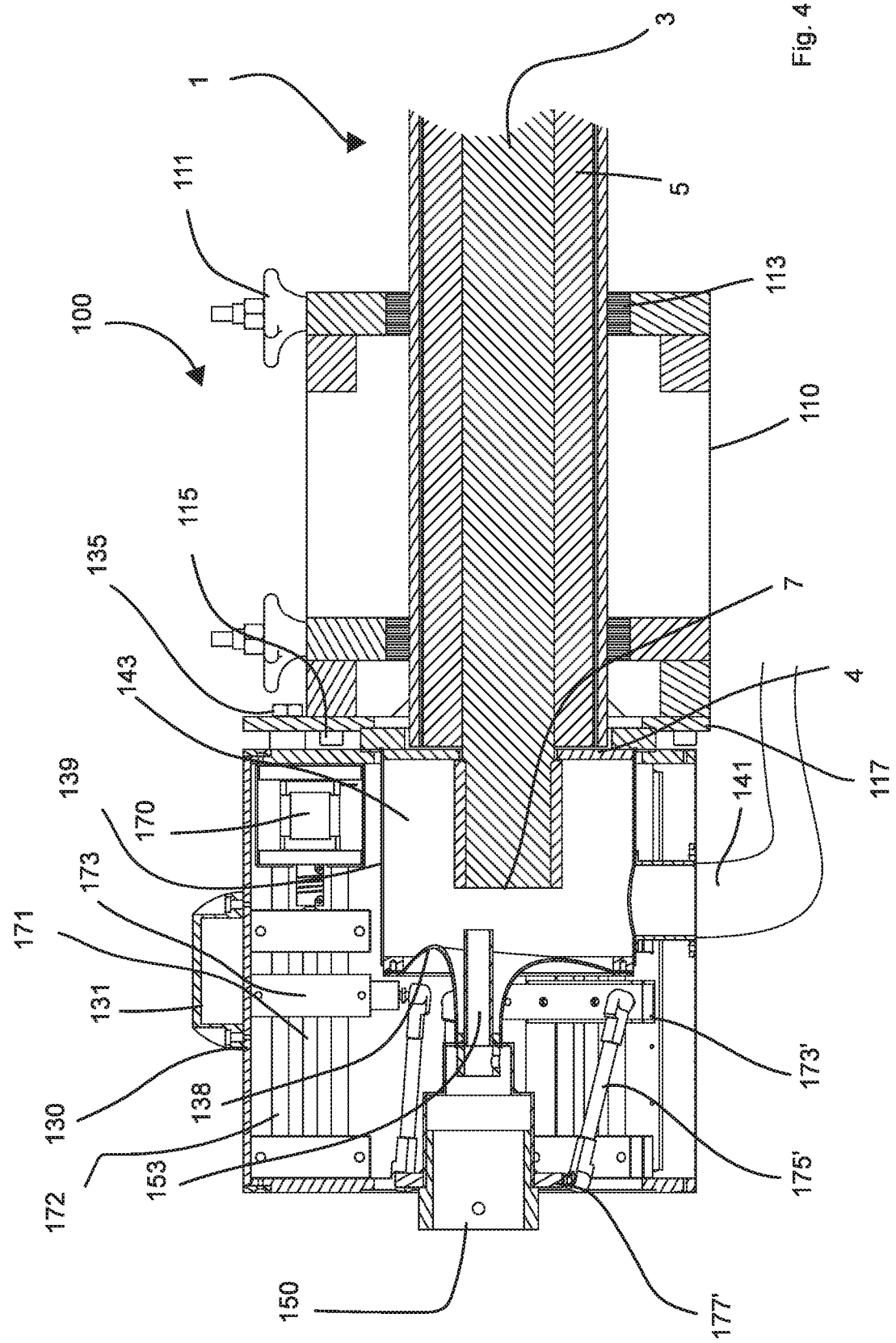
Figure 5:
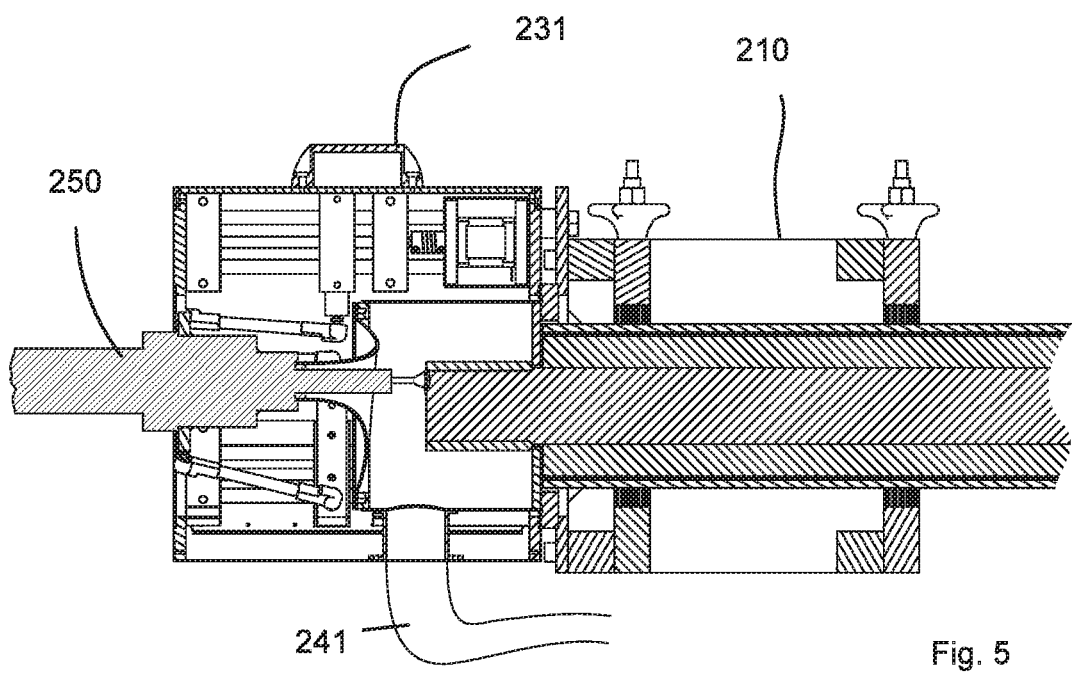
Figure 11:
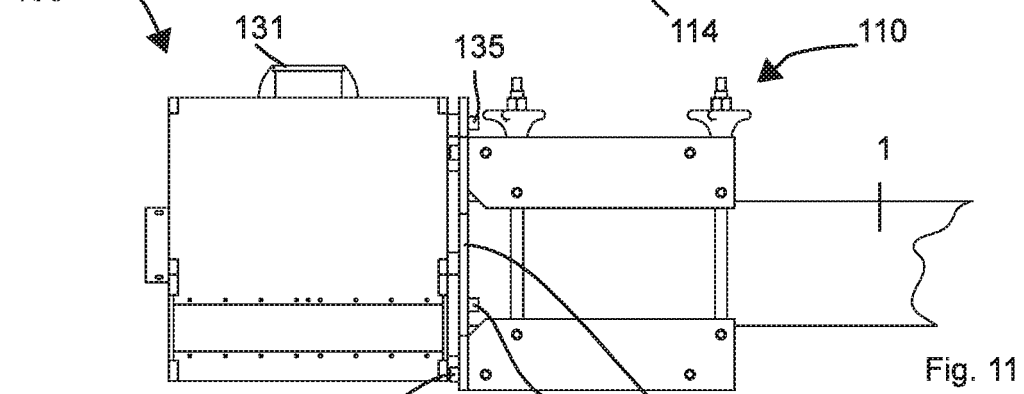
Figure 12:
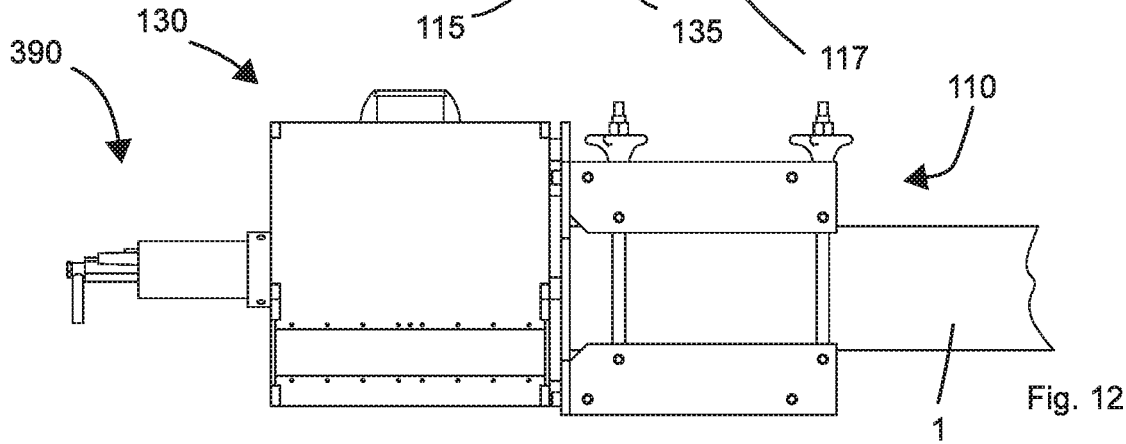
Figure 13:
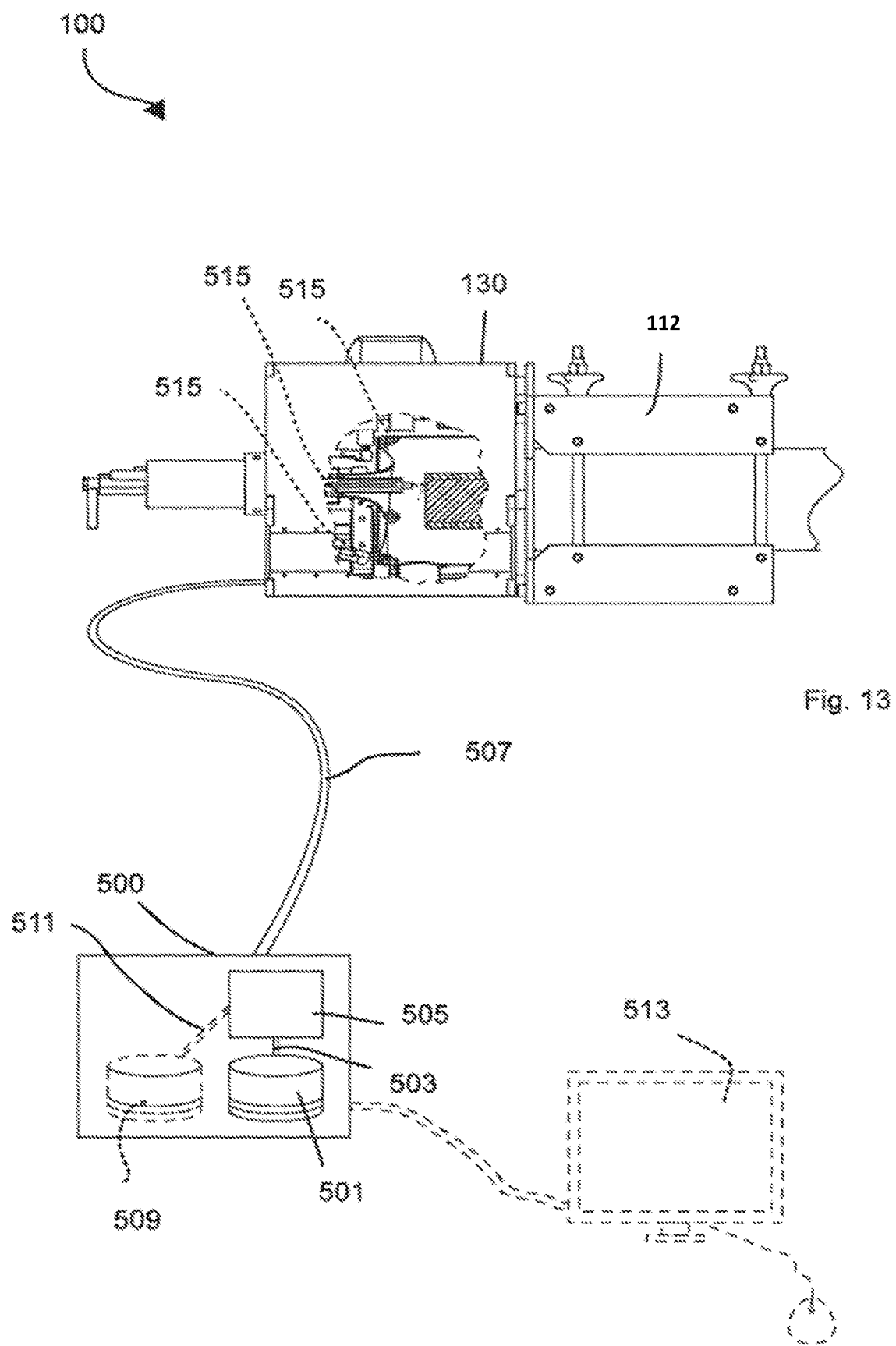

In the following, example embodiments are described according to the invention, where FIG. 1 is an isometric view of a cable treatment device according to the invention, FIG. 2 is an isometric inside view of a cable treatment device according to the invention, FIG. 3 illustrates a portable cable treatment device according to the invention, FIG. 4 is a cross-sectional view of cable treatment device according to the invention, FIG. 5 illustrates an integrated welding cable treatment device according to the invention, FIGS. 6-8 illustrates various tools used according to the invention, FIG. 9-12 illustrate assembly of a cable treatment device according to the invention, and FIG. 13 illustrate a cable treatment device with a controller means according to the invention.

DETAILED DESCRIPTION OF DRAWINGS

In the following the invention is described in detail through embodiments hereof that should not be thought of as limiting to the scope of the invention.

FIG. 1 illustrate a cable treatment device 100 according to the invention attached to a cable 1. An affixing means 110 comprising an upper part 112 and a lower part 114 connected by elongate members 116 is frictionally attached to the cable by tightening the four fixing bolts 111, which presses the upper part 112 and the lower part 114 together. The attachment to the cable 1 is improved by the use of grooves 113 advantageously on both the upper part 112 and the lower part 114, biting into the cable sheathing. Other affixing means 110 may naturally be used instead. This ensures a firm attachment to the cable.

The affixing means 110 further has an interface plate 117 attached to the upper part 112 and the lower part 114 with bolts 115 through guides. These guides allow the interfacing plate 117 to be used for various cable dimensions, as various distances between the upper plate 112 and the lower plate 114 are accommodated.

A treatment controlling means 130 attaches to the affixing means 110 with bolts 135 through the interface plate 117. FIG. 1 further illustrate a handle 131 for carrying the cable treatment member 130 and a tooling means 150.

FIG. 2 is an isometric inside view of the treatment controlling means 130 of the tooling device 100 described in relation to FIG. 1. As in FIG. 1, the affixing means 110 is attached around a cable 1, and the treatment controlling means 130 is attached to the affixing means 110 using an interface plate 117 and bolts 115, 135.

Inside the treatment controlling means 130, the kinematic means is located. A plurality of motors 170, 170' drive spindles 171, 171'. The spindles engage, in conjunction with their neighbouring guide rails 172, 172', to direct the movement of spindle blocks 173, 173' up and down the spindles 171, 171'. The spindle blocks are then attached to connecting rods 175. The connecting rods attach to a tooling means 150, and the combined control of the plurality of motors 170 then directs the movement of the tooling means 150. The tooling means 150 ends in an attachment to a flexible sheathing 138 that does not impede the free movement of the tooling means. The flexible sheathing 138 attaches to a cylindrical wall 139.

FIG. 3 illustrates a preferable embodiment of the invention, where it relates to a portable cable treatment device. In the illustrated embodiment, a technician can easily pick up and carry both the affixing means 110 and the treatment controlling means 130 and for example take them from his truck to the work site. In other words, it fits easily into his tool repertoire. Advantageously, by making the affixing means 110 and the treatment controlling means 130 portable, they also comply with weight-related and other relevant regulations.

FIG. 4 is a cross-sectional view of the cable treatment device according to the invention. The cable 1 is shown to comprise a conductor 3 and isolation and sheathing 5. The conductor most often comprises several individual power-transferring strands/wires and sectors, while the isolation and sheathing generally comprises a plurality of functional layers of various materials. The cable 1 further has a cable end 7.

The affixing means 110 has grooves 113 and fixing bolts 111. The interface plate 117 connects the affixing means 110 and the treatment controlling means 130 using bolts 115, 135. The treatment controlling means 130 has a handle 131.

The cable end 7 extends into a work chamber 143 formed between the cylindrical wall 139, the flexible membrane 138, and an shielding plate 4, the latter being attached to the cable 1 prior to insertion of the cable end 7 into the work chamber 143 to protect at least parts of the isolation and sheathing 5.

A gas vent or suction channel 141 is preferably present as part of the wall of the work chamber 143, to allow fluids as well as solid materials to be evacuated as well as produce a slight underpressure in the work chamber that minimises contamination of the surrounding air environment. A vacuum pump can be mounted at the far end of the channel. The tooling means 150 furthermore has a tool channel 153 that leads to the work chamber 143. This allows access to the cable end 7 for the given tool in a manner that is controlled by the tooling means comprising the mechanism and in the shown embodiment further comprise motors 170. The tooling means 150 is adapted to receive a tool which then blocks off fluid movement through the tool channel 153 except for that needed for the particular tool. Thereby, the work chamber 143 has a fluid-tight seal to the outside environment. This allows for a much safer work environment for technicians 10.

The tooling means 150 is controllably moved by a kinematic means. A plurality of motors 170 drive spindles 171, 171'. The spindles engage, in conjunction with their neighbouring guide rails 172, 172' to direct the movement of spindle blocks 173, 173' up and down the spindles 171, 171'. The spindle blocks 173, 173' are then attached to connecting rods 175, 175'. The connecting rods attach to a tooling means 150, and the combined control of the plurality of motors 170 then directs the movement of the tooling means 150. By using a delta robot type control mechanism as shown in FIG. 4, the tooling means allows controlled movement of the tooling means 150 in the three spatial dimensions and furthermore allows rotating it. This ensures increased cable end surface treatment quality and allows alignment. Each kinematic chain is successfully constrained and connected to a motor 170, allowing predictable motion. The kinematic chains are connected at their ends 177, 177' by attaching to the same element, the tooling means 150. In other words, the kinematic means shown in the figures is a parallel manipulator. Other manipulator layouts can be envisioned according to the invention.

By the work chamber 143 being fluid-tight and by the kinematic means being outside this work chamber 143, the wear on the kinematic means is minimised, while the size and hence the power and rigidity of respectively the motors and the mechanisms are maintained.

FIG. 5 illustrates a welding cable treatment device 200 according to the invention, with a handle 231, a suction channel 241 and an attachment means 210 and a kinematic means 230 both otherwise as described in relationship with previous figures, such as FIG. 4. The tooling means is attached to an integrated welding tool head 250, such as by welding, screwing, or bolting. This ensures a simple cable treatment device and a simple operation, where a technician who only needs to weld the cable end does not need to bring other tools.

FIGS. 6-8 illustrate a modular cable treatment device 300 treating a cable end 7 using various tools according to the invention. In this embodiment, the tooling means has a tool socket 350, adapted for easy and user-friendly plugging and unplugging of various modular tool heads 390. This allows for a more complete and simpler cable end 7 treatment while maintaining control of the process and air environment throughout the process. The modular tool heads 390 are adapted to fit the tool socket 350 in a manner that seals and prevents or limits fluid access through the tool socket 350 thereby keeping the work chamber 343 isolated during treatment of the cable end 7.

FIG. 6 illustrates a modular cable treatment device 300 with a handle 331, a suction channel 341 and a modular cold spraying tool head 391 plugged into the tool socket 350. Particulate matter 392 is being ejected onto the cable end 7.

FIG. 7 illustrate the modular cable treatment device 300 with a modular needle hammer tool head 393 plugged into the tool socket 350. The modular needle hammer tool head 393 is hammering 394 the cable end 7, such as to prepare it for further treatment.

FIG. 8 illustrate the modular cable treatment device 300 with a modular welding tool head 395 plugged into the tool socket 350, welding 396 the cable end 7.

FIGS. 9-12 are side views illustrating a method for attaching a cable treatment device 100 to a cable 1 prior to treatment of the cable end 7 and/or assembling the cable treatment device 100 prior to use.

Figure 9:
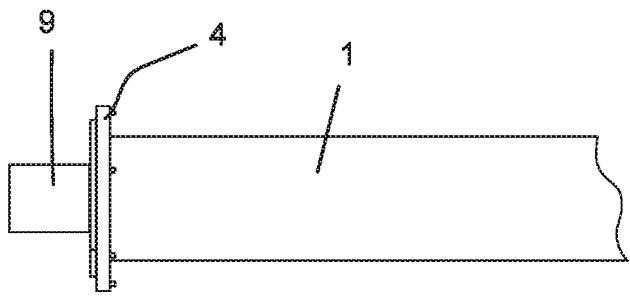

FIG. 9 illustrates the cable 1 after the isolation and sheathing 5 has been removed from the cable end 7, and a sleeve 9 and an shielding plate 4 have been attached. The sleeve 9 may be attached to hold the strands of the conductor close together and lock the wires and sectors to avoid longitudinal movement of the individual wires and sectors and/or to supply an electrically conductive outer shell for later cable joining/termination. The isolation shielding 4 is attached to protect components of the isolation and sheathing 5 from the processes and materials of the cable end treatments.

Figure 10:
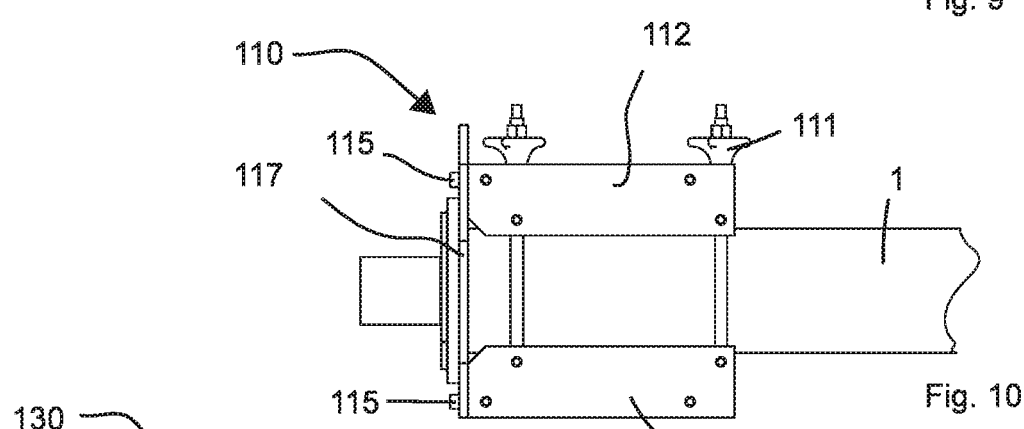

FIG. 10 illustrate the cable 1 of FIG. 9 with an affixing means 110 attached to the cable 1 by fixing bolts 111. An interface plate 117 is attached to the affixing means 110 using bolts 115 fixing to the upper part 112 and the lower part 114 through guide slits in the interface plate 117. This may be installed after the affixing means 110 has been satisfactorily attached to the cable 1, or it may be pre-installed.

FIG. 11 illustrate the cable 1 of FIGS. 9-10 with a treatment controlling means 130 attached. Bolts 135 are attached to the treatment controlling means 130 through the interface plate 117, thereby fixing the treatment controlling means 130 relative to the cable end. If the treatment controlling means 130 has a tool permanently attached (not shown) to its tooling means 150, then the assembly is complete. This is the case for example if the cable treatment device 100 is a welding cable treatment device as described in relation to FIG. 5. In such cases, cable end treatment can then begin after attaching the treatment controlling means 130. The tooling means will be at a certain distance from the cable end at this point. Depending on how far along the cable the affixing means 110 has been secured, this distance may vary. This may be accommodated by a sensor means or even manual settings means, ensuring that a perfect fit is not necessary when securing the affixing means 110.

FIG. 12 illustrates a final step in assembly of certain embodiments of the invention, such as for a modular cable treatment device 300. In this step, a modular tool head 390 is inserted into the tool socket 350 for use to treat the cable end.

FIG. 13 illustrates a controller means 500 for controlling the cable treatment device 100. The controller means 500 has a storage means 501 such as a database for storing cable end treatment data being relevant to treating a cable end 7. This may comprise a map corresponding to the surface area of the conductor end, as well as information relating to the tooling speed, i.e., how fast or slow the tool head should move. It may also relate to a specific pathway to be undertaken by the tool head to perform a given treatment. This may comprise a flat path relative to the cable end surface 7 and/or a change in the treatment distance or an accommodation to progressively changed cable end dimensions.

The controller means 500 further comprise signaling means 503 to signal the cable end treatment data from the storage means 501 to a processing means 505.

The processing means 505 may for example be a microprocessor or a CPU of a personal computer; in any regard it translates the cable end treatment data 501 to operation instructions adapted to be executed by a plurality of motors connected to the kinematic means through force input connections. The mapping of how movement along the cable end surface translates into kinematic motion of the kinematic means and ultimately how the individual motors should be operated, is preferably pre-established but may also be referenced simultaneously with operating the cable treatment means 100.

The controlling means finally comprises transmission means 507 for transmitting the operation instructions. These are then transmitted to the plurality of motors 170 to move the tool head relative to the cable end, whereby, in conjunction with operating the tool head itself, the cable end is treated.

Besides the plurality of motors, the controller means (500) may also preferably control the operation of the tool head attached to the tooling means.

The dashed lines indicate optional variations of the controller means 500. The first variation is to use a profile storage means 509 for storing profiles having profile parameters. Profile parameters relates to cable type, tool type and/or treatment type.

A user input means 513 such as a touch screen or a screen and a keyboard/mouse combination then allow a technician to select a profile relevant to the particular treatment to be performed. The relevant profile parameters are then signalled using profile signalling means 511 to the processing means 505, which then takes the profile parameters into account when creating the operation instructions for the plurality of motors.

Using profile parameters increases treatment quality and allows using the cable treatment device 100 accurately for a multitude of different situations.

The second optional variation of the controller means 500 includes a sensing means 515 for sensing cable parameters and/or treatment parameters before, during and/or after a treatment. This is then transmitted to the processing means 505 which may adapt the operation instructions if certain sensory criteria are met, such as identifying a weak spot when welding.

The controller means 500 can of course be integrated in the treatment controlling means 130 or another part of the device body.

EXAMPLE TREATMENT METHODS OF THE INVENTION

The following examples may apply to any of the previously described embodiments unless otherwise specified. The examples are illustratively specific to give a sense of the range of options and should not be thought of as limiting to the scope of the invention.

Example 1

A cable end is treated through a simple, one-step process using a modular cable treatment device with a welding tool or an integrated welding cable treatment device. The device is controlled to weld together all necessary strand ends and make any other welds, where the treatment pattern is fitted according to topological data on the cable end surface.

Example 2

More complicated treatments can be performed on the cable end according to the invention. An example treatment is to first mount a modular cable end treatment device. A modular needle hammer tool head is inserted in the tool socket to make the cable end flatter. Afterwards, the modular needle hammer tool head is switched out for a modular cold spraying tool head to build an electrically conductive layer on the end of the newly flattened cable end.

Example 3

A third example of a cable end treatment according to the invention is a preparation treatment. A combined pneumatic/blowtorch tool head is used to blow off coarse particles and burn away impurities depending on surface characteristics. An optical sensor transmits data relating to surface parameters to a processor that evaluates the surface simultaneously with the cleaning treatments to determine which of the tools should treat a given area, as well as informing on the cleanliness of the cable end. The treatment stops when certain optical parameters are met.

Example 4

A cable end surface is welded while an optical sensor monitors progress and informs on the treatment to correct the welding in real time. It monitors both the quality of the welds themselves as well as potentially any vapour formation that may be indicative of melted polymers in the weld. The information collected along the process is uploaded to a database for providing a report and presenting the quality control.

Example 5

A cable end is inserted into the cable treatment device to identify weak spots after a weld has been found to be too poor, but the weak point is difficult to identify. The device may then find a potentially problematic area and request a specific tool for treating the weakness.

EMBODIMENTS

A. A cable treatment device (100) for treatment of the end section (7) of a power cable (1), the cable treatment device (100) comprising:
  a sealed work chamber (143), the sealed work chamber (143) having an outer wall (139) attached to a flexible membrane (138), said wall and membrane substantially sealing the work chamber (143) from an outside environment, the sealed work chamber (143) further having
  a workpiece opening for inserting a cable end (7) in a first side of said sealed work chamber (143), said workpiece opening adapted to sealingly engage against the end section (7) or circumference of said power cable (1), and
  a tool head opening (153) connected to the tooling means (150) in a second, opposite side of said sealed work chamber (143), allowing placing a tool head into the sealed work chamber (143), where the tool head opening (153) or the tooling means (150) is adapted to sealingly engage with an inserted tool,
  a kinematic means for attaching relative to the to the sealed work chamber (143), said kinematic means adapted to provide kinematic motion relative to said sealed work chamber (143), the kinematic motion being fully controllable through a plurality of force input connections, and
  a tooling means (150) attached to said kinematic means, said tooling means (150) adapted to receive said kinematic motion, wherein the kinematic means allows the tooling means (150) to move cross-sectionally relative to the extension of a power cable (1) and across its end section (7) inserted in the sealed work chamber (143).

What is claimed is:

1. A cable treatment device for treatment of an end section of a power cable, the cable treatment device comprising:
    an affixing means for reversible securing around a circumference of the power cable;
    a kinematic means and attachment means for attaching to the affixing means; and
    a tooling means attached to said kinematic means, said tooling means adapted to receive a kinematic motion, wherein the kinematic means allows the tooling means to move cross-sectionally relative to an extension of the power cable, to which the affixing means is securable, wherein said kinematic means is adapted to provide the kinematic motion of said tooling means relative to said attachment means, and
    wherein the kinematic motion being controllable through a plurality of force input connections.

2. The cable treatment device according to claim 1, wherein the cable treatment device further comprises a tool head connected to said tooling means, said tool head being a cable end treatment tool facing a cable end of the power cable securable by the affixing means.

3. The cable treatment device according to claim 2, wherein the tool head comprises an additive manufacturing tool.

4. The cable treatment device according to claim 2, where the tool head comprises a welding tool or a cold spraying tool.

5. The cable treatment device according to claim 1, wherein the cable treatment device comprises a tool head or a modular tool head and wherein said tool head or modular tool head comprises two cable end treatment tools.

6. The cable treatment device according to claim 5, wherein a first cable end treatment tool of the tool head is a cold spraying tool, and a second cable end treatment tool is a peening tool or a heat treatment tool.

7. The cable treatment device according to claim 1, wherein the cable treatment device further comprises a controller means comprising:
    storage means for storing cable end treatment data translatable to operation of a plurality of motors;
    signalling means for signalling cable end treatment instructions from said storage means;
    processing means for receiving and processing said cable end treatment instructions to produce operation instructions for said plurality of motors; and
    transmission means for transmitting said operation instructions, such as transmitting to said plurality of motors.

8. The cable treatment device according to claim 7, wherein the controller means further comprises:
    profile storage means for storing profiles comprising profile parameters relating to at least one of: cable type, tool type or treatment type;
    user input means for selecting a profile from among profiles for a given cable end treatment; and
    profile signalling means for signalling profile data according to the selected profile,
    wherein said processing means is adapted to receive said profile parameters, and
    wherein said processing takes said profile parameters into account to produce profile specific operation instructions.

9. The cable treatment device according to claim 1, wherein the cable treatment device further comprises a sensing means arranged to sense parameters of the treatment and/or the power cable secured by the affixing means.

10. A cable treatment device according to claim 1, wherein the cable treatment device further comprises a sealed work chamber, the sealed work chamber having an outer wall attached to a flexible membrane, said wall and membrane substantially sealing the work chamber from an outside environment, the sealed work chamber further comprises
    a workpiece opening for inserting a cable end in a first side of said sealed work chamber, said workpiece opening adapted to sealingly engage against the end section or circumference of said power cable, and
    a tool head opening connected to the tooling means in a second side of said sealed work chamber, allowing placing a tool head into the sealed work chamber, where the tool head opening or the tooling means is adapted to sealingly engage with an inserted tool.

11. The cable treatment device according to claim 1, wherein said affixing means is adjustable to secure power cables of different diameters.

12. A cable treatment device for treatment of an end section of a power cable, the cable treatment device comprising:
    an affixing means for reversible securing around a circumference of the power cable;
    a kinematic means and attachment means for attaching to the affixing means; and
    a tooling means attached to said kinematic means, said tooling means adapted to receive a kinematic motion, wherein the kinematic means allows the tooling means to move cross-sectionally relative to an extension of the power cable, to which the affixing means is securable, wherein said kinematic means is adapted to provide the kinematic motion of said tooling means relative to said attachment means, and wherein the kinematic motion being controllable through a plurality of force input connections, and
    wherein the tooling means is a tool socket for reversibly attaching to a plurality of different modular tool heads.

13. The cable treatment device for treatment of an end section of a power cable, the cable treatment device comprising:
    an affixing means for reversible securing around a circumference of the power cable;
    a kinematic means and attachment means for attaching to the affixing means; and
    a tooling means attached to said kinematic means, said tooling means adapted to receive a kinematic motion, wherein the kinematic means allows the tooling means to move cross-sectionally relative to an extension of the power cable, to which the affixing means is securable, wherein said kinematic means is adapted to provide the kinematic motion of said tooling means relative to said attachment means,
    wherein the kinematic motion being controllable through a plurality of force input connections, and
    wherein the kinematic motion provided by the kinematic means and controllable through a plurality of force input connections has at least three axial degrees of freedom and one rotational degree of freedom.

14. A cable treatment device for treatment of an end section of a power cable, the cable treatment device comprising:
    an affixing means for reversible securing around a circumference of the power cable;

a kinematic means and attachment means for attaching to the affixing means; and a tooling means attached to said kinematic means, said tooling means adapted to receive a kinematic motion, wherein the kinematic means allows the tooling means to move cross-sectionally relative to an extension of the power cable, to which the affixing means is securable, wherein said kinematic means is adapted to provide the kinematic motion of said tooling means relative to said attachment means, wherein the kinematic motion being controllable through a plurality of force input connections, and wherein the cable treatment device further comprises a plurality of motors connected to the kinematic means through the plurality of force input connections.

15. A cable treatment device in combination with a power cable, wherein the cable treatment device comprises:

an affixing means for reversible securing around a circumference of the power cable;

a kinematic means and attachment means for attaching to the affixing means; and a tooling means attached to said kinematic means, said tooling means adapted to receive a kinematic motion, wherein the kinematic means allows the tooling means to move cross-sectionally relative to an extension of the power cable, to which the affixing means is securable, wherein said kinematic means is adapted to provide the kinematic motion of said tooling means relative to said attachment means, wherein the kinematic motion being controllable through a plurality of force input connections, and wherein an affixing axis is colinear with the central axis of the power cable secured by the affixing means, the affixing axis being normal to a plane intersecting said cable at a right angle, where the kinematic means is adapted to attach to the affixing means in a manner whereby it is oriented and located angularly to the affixing axis relative to the affixing means providing that the cable treatment device is adapted to treat a power cable end surface of a cable end secured by said affixing means for cables having end surfaces being angular to said plane.

16. A cable end treatment device in combination with a power cable according to claim 15, wherein the combination comprises two power cables, each comprising a second affixing means, and where the kinematic means has a second attachment means to attach to this second affixing means, allowing the kinematic means to attach to two adjacent affixing means secured to the two adjacent power cables whose central axes are collinear, and where said cable end treatment device is adapted to treat opposed end surfaces being said angular end surfaces of said two power cables, such as said opposed end surfaces being arranged close to form a V shape or an X shape.

17. A cable treatment device for treatment of an end section of a power cable, the cable treatment device comprising:

an affixing means for reversible securing around a circumference of the power cable;

a kinematic means and attachment means for attaching to the affixing means; and a tooling means attached to said kinematic means, said tooling means adapted to receive a kinematic motion, wherein the kinematic means allows the tooling means to move cross-sectionally relative to an extension of the power cable, to which the affixing means is securable, wherein said kinematic means is adapted to provide the kinematic motion of said tooling means relative to said attachment means, wherein the kinematic motion being controllable through a plurality of force input connections, and wherein the cable treatment device further comprises cooling means adapted to be secured around the cable end section to cool the cable during treatment.

18. The cable treatment device for treatment of the end section of a power cable, the cable treatment device comprising:

an affixing means for reversible securing around a circumference of a power cables;

a treatment controlling means comprising a kinematic means;

an attachment means for attaching the treatment controlling means to the affixing means; and a tooling means attached to said kinematic means, wherein the kinematic means is adapted to provide a kinematic motion of said tooling means to move said tooling means cross-sectionally relative to an extension of a power cable along a plane in front of the power cable, when said power cable is secured by said affixing means.

19. A cable treatment device for treatment of the end section of a power cable, the cable treatment device comprising:

an affixing means for reversible securing around a circumference of a power cable;

a treatment controlling means comprising a kinematic means;

an attachment means for attaching the treatment controlling means to the affixing means; and a tooling means attached to said kinematic means, wherein the kinematic means is adapted to provide a kinematic motion of said tooling means to move said tooling means cross-sectionally relative to an extension of a power cable along a plane in front of the power cable, when said power cable is secured by said affixing means, wherein the treatment controlling means comprises a sealed work chamber comprising a workpiece opening for inserting a cable end and an oppositely located a tool head opening, and wherein said kinematic means is adapted to provide the kinematic motion relative to said sealed work chamber.

* * * * *